United States Patent Office 2,986,577
Patented May 30, 1961

2,986,577

PRODUCTION OF ESTERS AND ALCOHOLS

George A. Kurhajec, Orinda, Calif., assignor to Shell Oil Company, a corporation of Delaware No Drawing. Filed July 28, 1958, Ser. No. 751,123

11 Claims. (Cl. 260—488)

This invention relates to the production of carboxylic acid esters and alcohols from readily available starting materials comprising carbon monoxide, alcohols and/or olefins.

Because of their relatively high cost, many carboxylic acid esters, including, for example, certain alkyl esters of branched-chain carboxylic acids, such as, trimethyl acetic, 2,4-dimethyl valeric, dimethyl propyl acetic, etc. can generally not be employed in many important potential fields of application. The high cost of many of these materials is often attributable to the complexity of operative steps necessitated in their production by methods used heretofore. Preparation of certain of these esters by such methods as the esterification of a corresponding alcohol is often impractical because of the cost involved in the initial preparation, separation and purification of the necessary alcohol starting material.

A potential usage of many of these esters is as starting material for the production of valuable chemical derivatives; the methyl ester of trimethyl acetic acid is readily converted to valuable neopentyl alcohol. Therefore, a process enabling efficient practical-scale production of the desired esters directly from readily available low-cost starting materials, also provides a route to valuable chemical derivatives heretofore often obtainable only by relatively costly operative procedures.

It is therefore an object of the present invention to provide an improved process enabling the more efficient production of alkyl esters of carboxylic acids from readily available starting materials comprising carbon monoxide, alcohols and/or olefins with a minimum of operative procedures.

Another object of the invention is the provision of an improved process enabling the more efficient production of alkyl esters of branched-chain carboxylic acids with a minimum of operative steps from readily available starting materials comprising carbon monoxide, alcohols and/or olefins.

Still another object of the invention is the provision of an improved process enabling the more efficient production of alkyl esters of trimethyl acetic acid.

Yet another object of the invention is the provision of an improved process enabling the more efficient production of valuable aliphatic alcohols from readily available relatively low-cost starting materials with a minimum of operative steps.

A specific object of the invention is the provision of an improved process enabling the more efficient production of neopentyl alcohol from carbon monoxide and tertiary butyl alcohol. Other objects and advantages of the present invention will become apparent from the following detailed description thereof.

It has now been found that esters of secondary and tertiary organic acids are produced with substantially improved efficiency by reacting an alcohol and/or olefin with carbon monoxide in the presence of concentrated sulfuric acid in the liquid phase, in the absence of any substantial amount of water, thereafter reacting the resulting reaction mixture with an alcohol in a second reaction step, and separating carboxylic acid ester from the reaction mixture resulting from said second reaction step.

Organic charge materials reacted with carbon monoxide in the first step of the process of the invention comprise broadly hydrocarbyl alcohols and olefinic compounds having at least three carbon atoms to the molecule. Suitable organic charge materials comprise the saturated aliphatic monohydric alcohols having at least three carbon atoms to the molecule, such as, for example: n-propanol, n-butanol, tertiary butanol, isopropanol; the normal secondary, and tertiary pentanols, hexanols, heptanols, octanols, nonanols, decanols; cyclohexanol, methylisobutyl carbinol, cyclopentyl carbinol; etc. Suitable alcohol charge materials comprise mixtures of alcohols, the alcholic products obtained in the Oxo synthesis, etc. Suitable olefinic charge materials comprise the monoolefins having at least three carbon atoms to the molecule such as, for example, propylene, n-butylene, isobutylene, the amylenes, the hexalenes, the octalenes, the nonalenes, the decalenes, their homologues, etc.; olefinic polymers, such as propylene tetramer; and the like. Included in the suitable organic materials which may be charged to the first step of the process of the invention are organic compounds having both carbinol groups and olefinic unsaturation, as well as olefinic compounds having substituents which do not adversely affect the course of the reaction; such suitable materials comprise, for example, 4-methyl-4-pentene-2-ol, ricinoleic acid, soya fat acid, and the like.

Alcohols and/or olefins having from three to twenty carbon atoms to the molecule constitute preferred charge materials to the process. Of the suitable alcohol and olefin charge materials those wherein a hydroxyl group, or an aliphatic olefinic double bond, is directly attached to a secondary or tertiary carbon atom of aliphatic character are particularly preferred. Mixtures of alcohols and olefins may be charged to the process of the invention.

The alcohol and/or olefinic charge to the process of the invention need not necessarily be pure. Impurities in the amounts generally encountered in these materials as obtained commercially do not have any substantial adverse effect upon the efficiency of the process. Such impurities may comprise, for example, residual hydrocarbon material from which the alcohols are derived, sulfur compounds, etc.

The carbon monoxide reactant need not necessarily be pure. Suitable carbon monoxide charge materials comprise the commercially available carbon monoxide and carbon monoxide-containing gases. The presence therein of fixed gases and minor amounts of saturated hydrocarbons generally does not adversely affect the efficiency of the process to any substantial degree. A suitable carbon monoxide charge comprises coke-oven gas, which may often be used as such without initial concentration of the carbon monoxide.

Interaction of the alcohol and/or olefin reactant with carbon monoxide in the first step of the process of the invention is effected in the presence of concentrated sulfuric acid. Essential to the attainment of the objects of the invention is the use of sulfuric acid in concentrated form, that is, in a concentration above 90% and preferably above 95%. Dilute sulfuric acids generally lead to the obtaining of reaction mixtures containing relatively little if any of the desired products.

The reaction is executed in the presence of a molecular excess of concentrated sulfuric acid. Mole ratios of sulfuric acid to alcohol and/or olefin charge in the range of from about 2:1 to about 10:1, have been found satisfactory. Greater or lesser amounts of sulfuric acid may, however, be employed within the scope of the invention. In a preferred method of executing the process of the invention the concentrated sulfuric acid is used in amounts exceeding about four moles of the acid per mole of alcohol and/or olefin.

A particular advantage of the invention resides in the fact that the reaction of the alcohol and/or reactant with carbon monoxide is carried out at relatively mild conditions. In the first stage of the process temperatures of, for example, from about −10° to about 100° C., and preferably in the range of about 20° to about 60° C. are employed. Pressures ranging from about atmospheric to about 1,500 p.s.i.g. and higher may be used. However, pressures higher than about 700 p.s.i.g. need generally not be used. Pressures in the range of, for example, from about 100 to about 650 p.s.i.g. are generally preferred. A particularly suitable pressure range is that from about 450 to about 550 p.s.i.g. Conditions are controlled so that at least the greater part of the alcohol and/or olefin charge to the process is in the liquid phase throughout the course of the reaction in the first stage of the process.

Essential to the attainment of the objects of the invention is the avoidance of introduction of any substantial amount of water into the reaction zone from an outside source during the course of the reaction of the organic charge with the carbon monoxide.

Alcohol and/or olefin, as well as the carbon monoxide charge to the process, may be subjected to suitable pretreatment to effect the removal of water and/or impurities therefrom. Such pretreatment may comprise one or more such steps as, for example, distillation, contact with suitable adsorbent material such as, for example, charcoal, adsorptive alumina, etc.; the step chosen being governed by the material treated and the amount of impurity and/or water to be removed.

The reaction of the alcohol and/or olefin with carbon monoxide in the presence of concentrated sulfuric acid in the first stage of the process may be executed in batch, continuous, or semi-continuous operations. In a preferred method of carrying out the process the concentrated sulfuric acid is first introduced into the reaction zone. The reaction zone is then brought up to the reaction pressure by the introduction of carbon monoxide. The alcohol and/or olefin reactant is then introduced into the sulfuric acid, while under carbon monoxide pressure, in continuous or intermittent flow. The reaction zone is maintained at the desired reaction pressure by continuous pressuring with carbon monoxide. Contact between the alcohol, and/or olefin and carbon monoxide in the absence of added water is continued for a sufficient length of time to obtain a desired degree of conversion. Means assuring efficient contact between reactants and acid, such as stirring or other agitating devices are provided. The contact time preferably employed in the first stage of the process will vary in accordance with operating conditions and nature of the specific organic charge to the process. A contact time in the range of, for example, from about five minutes to three hours, is generally satisfactory. Longer or shorter contact times may, however, be employed within the scope of the invention. Generally it is preferred to continue the reaction of carbon monoxide with the alcohol and/or olefin charge in the absence of added water until the reaction has gone to substantial completion as evidenced by the cessation of carbon monoxide adsorption.

It is at times preferred to maintain the reaction conditions of temperature and pressure in the first stage of the process for a period of time beyond that at which substantial absorption of carbon monoxide by the liquid reaction mixture has stopped. Such "digestion" of the reaction mixture obtained in the first stage of the process may be executed in a zone in communication with, but separate from, the zone in which initial reaction of carbon monoxide with the organic reactant has taken place. The presence of an atmosphere of carbon monoxide, under the reaction pressure in the absence of added water is maintained throughout the reaction and optional "digestion" period constituting the first stage of the process.

Upon completion of the reaction of the carbon monoxide with the alcohol and/or olefin, and after the digestion period if this is employed, flow of carbon monoxide to the reaction mixture is stopped.

The reaction mixture obtained by interaction of carbon monoxide with the alcohol and/or olefin, in the presence of concentrated sulfuric acid and in the substantial absence of water, in the first stage of the process, is thereupon reacted with an alcohol, for example, methanol, in a second stage of the process. The relative amount of alcohol brought into contact with the reaction mixture emanating from the first stage of the process may vary within the scope of the invention. It is, however, preferably added in an amount which is at least equal to the stoichiometrical equivalent of the alcohol and/or olefin charge introduced into the first stage of the process.

In general the total reaction mixture produced in the first stage of the process is employed as a reactant to the second stage without the removal of components therefrom. Subjection of the reaction mixture produced in the first stage of the process to conventional means to effect the separation of materials, for example, unconverted starting materials such as carbon monoxide, therefrom, is comprised within the scope of the invention. In a preferred method of carrying out the invention the reaction mixture emanating from the first stage of the process is added slowly to a large excess of the alcohol forming the alcoholic reactant to the second stage of the process. The invention is, however, not limited to a specific method of effecting the admixture of the reaction mixture produced in the first stage of the process with the alcohol charge to the second stage.

Although methanol has been chosen as the preferred alcoholic charge to the second stage of the process in the present detailed description of the invention, it is to be understood that the invention is in no wise limited to the use of but this specific alcohol as charge to the second stage of the process. The alcohol so admixed with the reaction mixture emanating from the first stage of the process may comprise broadly any hydrocarbyl alcohol capable of undergoing esterification reaction with an organic acid. Thus, the hydrocarbyl alcohol charge to the second stage of the process may comprise saturated and/or unsaturated monohydric and polyhydric alcohols of aliphatic or aromatic character. Examples of alcohols which may be employed as charge to the second stage of the process comprise: The primary, secondary and tertiary saturated aliphatic alcohols; unsaturated aliphatic alcohols, such as allyl alcohol, methallyl alcohol, and their homologues; polyhydric alcohols, such as butanediol-1,2, butanediol-1,3, butanediol-1,4, etc.; alcohols of aromatic character, such as benzyl alcohol, triphenyl carbinol, phenylethyl alcohol, and the like. Although a wide variety of alcohols may thus be used as charge to the second step of the process, these alcohols are not necessarily equivalent with respect to the efficiency with which they are converted to the desired ester products. A preferred class of alcohols employed as charge to the second stage of the process in accordance with the invention comprise the aliphatic primary monohydric alcohols having from one to about ten carbon atoms to the molecule, for example, methanol, ethanol, propanol, n-butanol, n-pentanol, hexanol, etc. Suitable alcoholic charge to the second stage of the process comprises mixtures of two or more of the suitable alcohols, alcoholic products obtained in the Oxo synthesis, etc.

The temperature preferably employed in the second stage of the process will depend to some extent upon the specific alcoholic charge material charged thereto and the nature of the reaction mixture emanating from the first step of the process. In general the second stage of the process is executed in the board temperature range of from about −50° to about 100° C., and preferably from about −10° to about 50° C. When employing a lower aliphatic monohydric saturated alcohol as the alcoholic charge to the second stage of the process the temperature is preferably maintained within the range of from about 0° to about 15° C. The second stage of the process may be executed at subatmospheric, atmospheric or superatmospheric pressures. In general it is preferred to maintain a substantially atmospheric, or slightly superatmospheric, pressure not exceeding about 150 pounds during the second stage of the process. Higher pressures may, however, be employed within the scope of the invention.

Solvents which are substantially inert or which do not adversely affect the reaction may be employed. Such solvents may be employed to dissolve a part or all of the alcoholic charge to either or both stages of the process or to aid in maintaining optimum reaction conditions.

Without intent to limit in any wise the scope of the invention by theory advanced herein to set forth more fully the nature of the invention it is believed that in the first stage of the process there is formed an intermediate reaction complex by interaction of the alcohol, carbon monoxide and the sulfuric acid. In the second stage of the process interaction of the second alcoholic charge with the complex formed in the first stage of the process results in formation of a reaction mixture comprising a carboxylic acid ester. When the organic charge to the first stage of the process consists of a secondary or tertiary alcohol, the ester product formed in the second stage will generally consist of an ester of the acid obtained by substituting a carboxylic acid group (—COOH) for the OH group attached to the carbinol carbon atom of the alcohol charge to the first stage of the process. Under the prescribed conditions the use of tertiary butyl alcohol as the alcohol charge to the first stage of the process of the invention results in a reaction mixture at the end of the second stage containing an ester of trimethyl acetic acid (pivalic acid) as the predominant ester product. Similarly the use of methyl isobutyl carbinol as organic charge to the first stage results in an ultimate product comprising an ester of 2,4-dimethyl valeric acid; cyclohexanol in an ester of cyclohexane carboxylic acid; isopropyl alcohol in an ester of isobutyric acid, etc. The use of a primary alcohol as charge to the first stage will generally result in a reaction mixture at the end of the second stage comprising an ester of a secondary acid corresponding to that obtained by replacing the —OH group with hydrogen and substituting a carboxylic acid group for a hydrogen attached to the carbon adjacent to the carbinol group of the charge. Thus when n-butyl alcohol is reacted with carbon monoxide in the first stage, the reaction mixture of the second stage contains an ester of 2-methyl butanoic acid.

When the organic component of the charge to the first stage of the process consists of an olefin of the class defined above, the reaction products obtained in the second stage will comprise esters of the acid corresponding to the compound obtained by substituting a carboxylic acid group (—COOH) for an olefin linkage in the olefin charged. Under the conditions defined herein, the use of propylene as organic charge to the first stage results in a reaction product at the end of the second stage comprising an ester of butyric acid. The use of isobutylene as organic charge to the first stage results in the obtaining of an ultimate reaction product in the second stage comprising an ester of pivalic acid. The ester function of the carboxylic acid ester obtained will generally correspond to the radical obtained by removing an —OH radical from the alcohol charged to the second stage of the process. When charging methanol to the second stage the ester ultimately obtained is a methyl ester. Similarly when charging propanol, butanol, or a pentanol to the second stage the ultimate product will be a propyl, butyl or amyl ester, respectively. Thus, when charging tertiary butyl alcohol and carbon monoxide to the first stage of the process and methanol to the second stage the ultimate product obtained is methyl pivalate.

When a higher-boiling compound of the class of suitable organic charge materials defined above, or a mixture of alcohols and/or olefins constitutes a charge to the process of the invention the final product is often one of relatively complex structure and/or composition having ester characteristics.

The desired ester product is readily separated from the reaction mixture obtained in the second stage of the process by conventional means comprising, for example, one or more such as, stratification, decantation, distillation, crystallization, extractive distillation, solvent extraction, chromatographic absorption, and the like. Generally the reaction mixture obtained in the second stage will separate into two liquid layers, an upper organic layer comprising the desired ester product and a lower layer comprising sulfuric acid. If an organic solvent is employed in the process this generally will be found in the upper layer. Recovery of the ester product from the organic layer is carried out by conventional means.

The process of the invention thus provides for the efficient production of the valuable esters of carboxylic acids from carbon monoxide and readily available alcohols and/or olefins with relatively high yields and with a minimum of operative procedure.

The esters thus obtained find application as such. However, they provide starting materials for the production of valuable chemical derivatives therefrom. Thus the esters of the invention are readily reduced by conventional methods to corresponding alcohols. The methyl ester of pivalic acid produced in accordance with the invention is readily converted to the valuable neopentyl alcohol by reduction in the presence of a hydrogenation catalyst, for example, copper chromite. The process of the invention thus provides an efficient and economical route to the production of alcohols heretofore not readily obtained without recourse to costly operative procedures.

The following examples are illustrative but not limiting of the invention claimed.

*Example I*

In the first stage of a two-stage process, six moles of concentrated sulfuric acid are charged to a stainless steel reactor. The sulfuric acid is first saturated with carbon monoxide by sweeping the reactor containing it with carbon monoxide and then maintaining the reactor under a carbon monoxide pressure of 500 pounds per square inch. While maintaining the reactor under a substantially constant 500-pound carbon monoxide pressure, and substantially at room temperature, there is slowly introduced into the concentrated sulfuric acid saturated with the carbon monoxide, two moles of tertiary butyl alcohol as a heptane solution. When the reaction of this first stage of the operation is complete, as evidenced by cessation of carbon monoxide absorption, the reactor is vented to atmospheric pressure. In a second stage of the process the reaction mixture thus obtained in the first stage of the process is slowly introduced into fifteen moles of cooled methanol at a temperature in the range of 2° to 11° C. Reaction between the methanol and the reaction mixture emanating from the first stage of the process is immediate; the resulting reaction mixture forming two liquid layers, an upper organic layer and a lower layer consisting essentially of sulfuric acid and methanol. The upper organic layer is extracted in liquid phase with heptane. The rich heptane extract thus obtained is analyzed by gas-liquid partition chromatography and found to consist of

|  | Percent |
|---|---|
| Heptane | 70 |
| Methyl pivalate | 23.5 |
| By-products, essentially, pivalic acid | 6 |

The lower, liquid, sulfuric acid-containing layer, formed in the second stage of the process, is extracted with benzene and methyl pivalate is separated from the benzene extract by distillation. There is obtained a total yield of about 80% of methyl pivalate.

*Example II*

108 grams of 2-methyl-2-pentanol is added slowly to 630 grams of concentrated sulfuric acid saturated with carbon monoxide. The reaction mixture is then subjected to a carbon monoxide pressure of 500 p.s.i.g. at room temperature. When absorption of carbon monoxide ceases the reaction mixture is brought to atmospheric pressure by venting carbon monoxide and 586 cc. of methanol is added while maintaining the mixture at a temperature in the range of 0° to 10° C. The resulting reaction mixture is thereupon extracted with normal heptane. The rich heptane extract is analyzed by gas-liquid partition chromatography and found to contain 36 grams of the methyl ester of dimethyl n-propyl acetic acid.

*Example III*

92.5 grams of 2-methylpentene-1 is introduced into 638 grams of concentrated sulfuric acid maintained under a carbon monoxide pressure of 500 pounds at room temperature. When no more carbon monoxide is absorbed the pressure on the reaction mixture is reduced to substantially atmospheric. The reaction mixture so obtained is thereupon slowly added to 475 grams of cooled methanol at a temperature of 10° C. Reaction takes place with the formation of separate liquid layers. The liquid layers thus formed are separated. The upper layer is extracted with heptane and the resulting heptane-rich fraction is subjected to analysis. The rich heptane extract is found to contain 17 grams of the methyl ester of dimethyl n-propyl acetic acid.

*Example IV*

Methyl dimethylneopentyl acetate is prepared by the procedure described in the foregoing Example III carried out under substantially identical conditions, except that diisobutylene instead of 2-methylpentene-1 is used as the organic charge reacted with carbon monoxide in the first stage of the process.

*Example V*

Methyl ester of $C_{13}$ carboxylic acid is prepared by the procedure described in the foregoing Example III carried out under substantially identical conditions with the exception that propylene tetramer is used as the organic charge reacted with carbon monoxide in the first stage of the process.

*Example VI*

130 grams of 2,5 - dimethylhexane - 2,5 - diol is introduced slowly into 500 cc. of 96% sulfuric acid maintained under a carbon monoxide pressure of 500 p.s.i.g. at room temperature. When reaction is complete as evidenced by cessation of carbon monoxide absorption the reaction mixture is brought to atmospheric pressure. The resulting reaction mixture is thereupon added slowly to 350 grams of ethanol. The organic layer of the two-phase reaction mixture thus obtained is extracted with nonane. The nonane-rich extract is freed of nonane solvent leaving a product believed to be a $C_{11}$ dicarboxylic acid diester.

*Example VII*

0.47 mole of n-propyl alcohol is introduced into concentrated sulfuric acid maintained under a carbon monoxide pressure of 500 p.s.i.g. at a temperature of about 50° C. When carbon monoxide absorption has ceased the reaction mixture is cooled to room temperature and the pressure vented to atmospheric. The resulting reaction mixture is thereupon added dropwise to 250 grams of ethyl alcohol at −20° C. The organic phase of the resulting reaction products is extracted with nonane, and ethyl isobutyrate is recovered from the resulting rich nonane extract by distillation.

*Example VIII*

A solution of cyclohexanol in n-heptane containing one mole of cyclohexanol is added to 300 cc. of concentrated sulfuric acid maintained under a carbon monoxide pressure of 500 p.s.i.g. at room temperature. When absorption of carbon monoxide is no longer apparent the reactor is vented to atmospheric pressure. The resulting reaction mixture is added slowly to 500 cc. of methanol at a temperature of about 5° C. The organic phase of the resulting reaction mixture is extracted with nonane. Methyl ester of cyclohexane carboxylic acid and of methylcyclopentane carboxylic acid in substantially equal amounts is separated from the rich heptane extract by distillation.

*Example IX*

Methyl pivalate, obtained in the process described in the foregoing Example I, is dissolved in methanol and subjected to hydrogenation at 250° C. and a hydrogen presusre of 3,300 pounds in the presence of copper chromite. Neopentyl alcohol is separated from the resulting hydrogenation product with a yield of 82% based upon the methyl pivalate subjected to the hydrogenation.

Similarly, methyl ester of dimethyl n-propyl acetic acid, obtained in foregoing Example II, is hydrogenated to 2,2-dimethylpentanol.

The invention claimed is:

1. The process for the synthesis of esters of carboxylic acids which comprises reacting an unsubstituted saturated aliphatic alcohol having from three to twenty-three carbon atoms to the molecule, in the liquid phase, with carbon monoxide in the presence of concentrated sulfuric acid having a concentration above 90%, in the absence of added water, at a temperature of from about −10° to about 100° C. at a pressure of from about atmospheric to about 1,500 p.s.i.g., said sulfuric acid being present in molecular excess relative to said unsubstituted saturated aliphatic alcohol, thereafter reacting the resulting reaction mixture in the absence of any substantial amount of free carbon monoxide with an unsubstituted aliphatic alcohol, and separating a carboxylic acid ester from the resulting reaction mixture.

2. The process in accordance with claim 1 wherein said unsubstituted saturated aliphatic alcohol reacted with said carbon monoxide contains from three to ten carbon atoms and said unsubstituted aliphatic alcohol reacted with said resulting reaction mixture is an unsubstituted saturated aliphatic alcohol having from one to ten carbon atoms to the molecule.

3. The process for the synthesis of alkyl esters of carboxylic acids which comprises reacting an unsubstituted aliphatic saturated monohydric alcohol having from three to twenty-three carbon atoms to the molecule, in the liquid phase, with carbon monoxide in the presence of concentrated sulfuric acid having a concentration above 90%, in the absence of added water, at a temperature of from about −10° to about 100° C. at a pressure of from about atmospheric to about 1,500 p.s.i.g., said sulfuric acid being present in molecular excess relative to said unsubstituted aliphatic saturated monohydric alcohol, thereafter reacting the resulting reaction mixture with a saturated aliphatic primary monohydric alcohol having from one to ten carbon atoms to the molecule in the absence of any substantial amount of free carbon monoxide, and separating an ester of a carboxylic acid from the resulting reaction mixture.

4. The process in accordance with claim 3 wherein said aliphatic saturated monohydric alcohol having from three to twenty-three carbon atoms to the molecule reacted with carbon monoxide is an aliphatic saturated monohydric tertiary alcohol.

5. The process in accordance with claim 3 wherein said saturated aliphatic primary monohydric alcohol having from one to ten carbon atoms reacted with said reaction mixture obtained by reacting said aliphatic saturated monohydric alcohol having from three to twenty-three carbon atoms with carbon monoxide is methanol.

6. The process in accordance with claim 5 wherein said reaction of said aliphatic saturated monohydric alcohol having from three to twenty-three carbon atoms with carbon monoxide is executed at a temperature of from about 20° to about 60° C.

7. The process for the production of alkyl esters of trimethyl acetic acid which comprises reacting tertiary butyl alcohol with carbon monoxide in the presence of concentrated sulfuric acid having a concentration above 90%, in the absence of added water, at a temperature of from about —10° to about 100° C., at a pressure of from about 100 to about 650 p.s.i.g., said sulfuric acid being present in molar excess relative to said alcohol, thereafter reacting the resulting reaction mixture with a monohydric lower saturated aliphatic alcohol at substantially atmospheric pressure at a temperature of from about —50° C. to about 100° C., in the absence of any substantial amount of free carbon monoxide, and separating the akyl ester of trimethyl acetic acid from the resulting reaction mixture.

8. The process in accordance with claim 7 wherein said concentrated sulfuric acid has a concentration of at least 95%.

9. The process for the production of an alkyl ester of a carboxylic acid which comprises reacting a tertiary aliphatic monohydric alcohol having from four to twenty carbon atoms with carbon monoxide in the liquid phase, in the presence of concentrated sulfuric acid having a concentration above 90%, in the absence of added water, at a temperature of from about —10° to about 100° C., at a pressure of from about atmospheric to about 650 p.s.i.g., said sulfuric acid being present in molecular excess relative to said alcohol, thereafter reacting the resulting reaction mixture with a lower monohydric aliphatic alcohol in the absence of any substantial amount of free carbon monoxide, and separating an alkyl ester of an organic acid from the resulting reaction mixture.

10. The process in accordance with claim 9 wherein the lower monohydric aliphatic alcohol reacted with said reaction mixture obtained by reacting said tertiary aliphatic monohydric alcohol with carbon monoxide is methanol.

11. The process for the production of methyl pivalate which comprises reacting tertiary butyl alcohol with carbon monoxide in the liquid phase, in the presence of concentrated sulfuric acid having a concentration above 90%, in the absence of added water, at a temperature of from about —10° to about 100° C., at a pressure of from about 100 to about 650 p.s.i.g., said sulfuric acid being present in molecular excess relative to said alcohol, thereafter reacting the resulting reaction mixture with methanol at a temperature of from about —10° to about 50° C. and substantially atmospheric pressure in the absence of any substantial amount of free carbon monoxide, and separating methyl pivalate from the resulting reaction mixture.

References Cited in the file of this patent

UNITED STATES PATENTS

| | | |
|---|---|---|
| 2,768,968 | Reppe et al. | Oct. 30, 1956 |
| 2,831,877 | Koch et al. | Apr. 22, 1958 |

Notice of Adverse Decision in Interference

In Interference No. 93,921 involving Patent No. 2,986,577, G. A. Kurhajec, PRODUCTION OF ESTERS AND ALCOHOLS, final judgment adverse to the patentee was rendered June 25, 1965, as to claims 1, 2, 3, 5 and 6.
[*Official Gazette December 14, 1965.*]